June 15, 1926.

M. D. DOMINGUEZ 1,588,710

PRESSURE OPERATED SNAP SWITCH

Original Filed Nov. 22, 1923    2 Sheets-Sheet 1

Inventor
MANUEL D. DOMINGUEZ.
Brown & Phelps
Attorneys

June 15, 1926.
M. D. DOMINGUEZ
1,588,710
PRESSURE OPERATED SNAP SWITCH
Original Filed Nov. 22, 1923   2 Sheets-Sheet 2
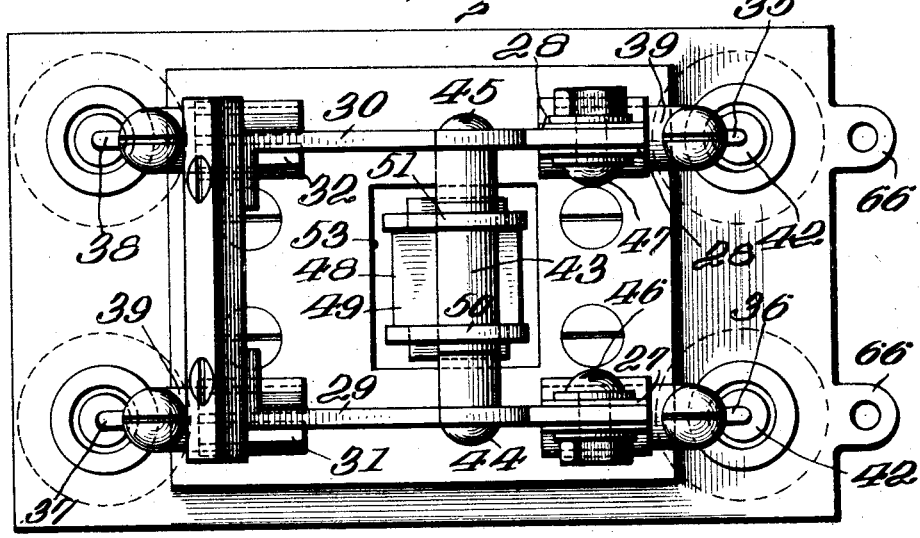
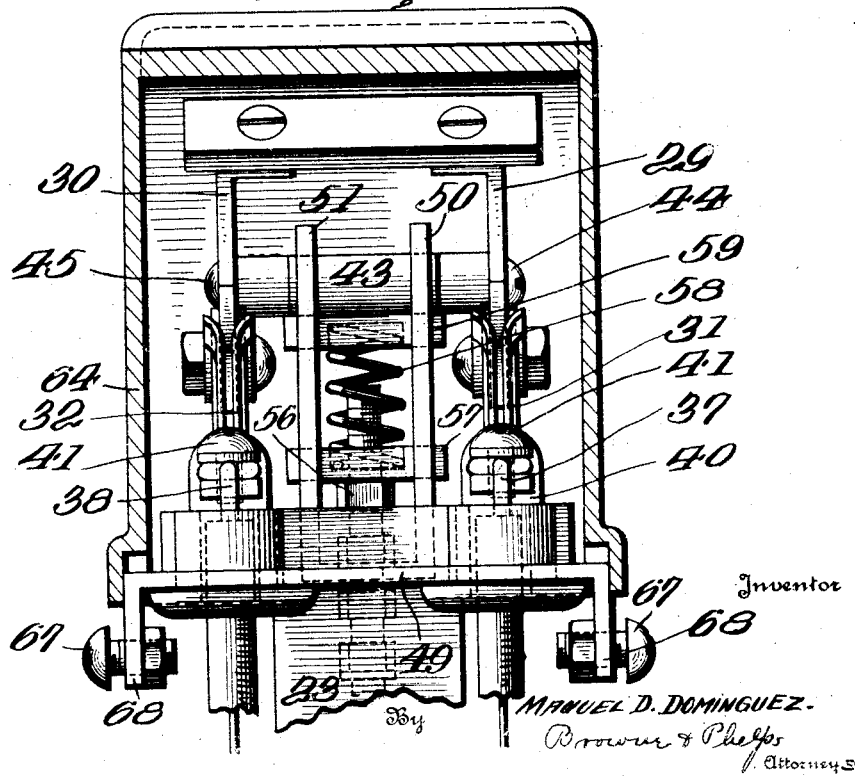

Patented June 15, 1926.

1,588,710

UNITED STATES PATENT OFFICE.

MANUEL D. DOMINGUEZ, OF NEW ORLEANS, LOUISIANA, ASSIGNOR TO CHARLES A. DENIS AND GEORGE SARPY, BOTH OF NEW ORLEANS, LOUISIANA.

PRESSURE-OPERATED SNAP SWITCH.

Application filed November 22, 1923, Serial No. 676,415. Renewed April 6, 1926.

The invention relates to switches, and has as an object the provision of a switch which may be operated by fluid pressure. A further object of the invention is the provision of a switch which may act automatically when the water faucet is opened, thereby reducing the pressure upon one side of a valve connected to the switch. A further object of the invention is the provision of a switch having means for supporting the same from the casing of the valve which operates the switch. A further object of the invention is the provision of a switch which will have positive means to supplement the spring which is normally designed to open the switch with snap action.

Other objects will appear from the following description when read in connection with the accompanying drawing showing an illustrative embodiment of the invention, and in which:—

Figure 2 is a plan view of the switch with its cover removed.

Figure 3 is a detail transverse section on line 3—3 of Fig. 1.

Figure 1:
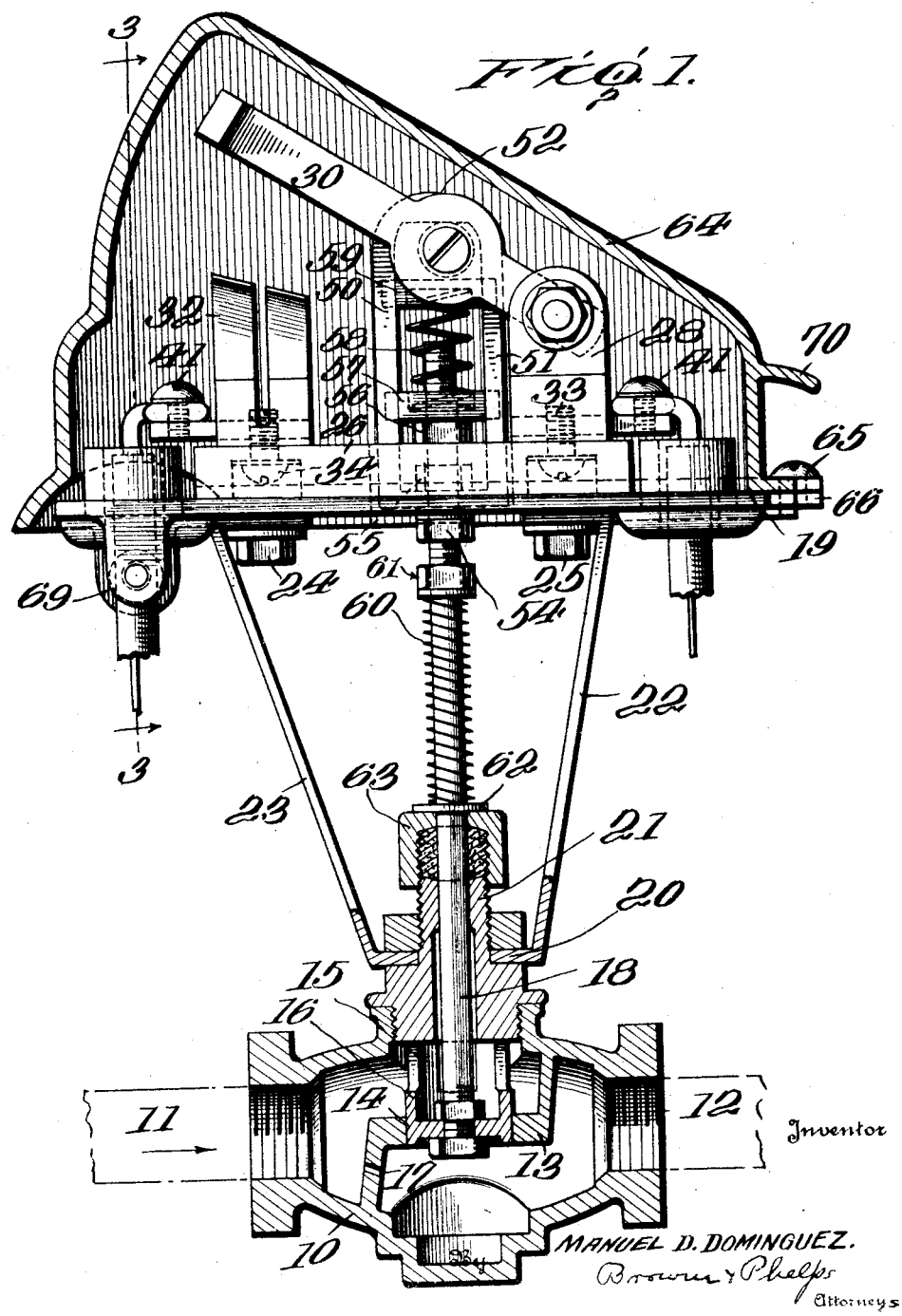
Figure 1 is a vertical central longitudinal section through the switch and the valve for operating the same.

As shown, the switch is adapted to be operated by means of a valve contained in a valve casing 10, to which water may be conducted by means of a pipe 11, shown in dotted lines, and from which water may be drawn by means of a pipe 12, also shown in dotted lines, the water flowing in the direction of the arrow, shown in Fig. 1. The water is adapted to flow through an opening in the partition 13, which partition is normally closed by means of a piston 14 having upwardly extending guiding portions 15 separated by openings at 16 to allow the water to flow through the partition 13 when the valve is opened.

To equalize pressure on the two sides of the piston when the faucet, not shown, connected to pipe 12 is closed, a small opening 17 is provided in a wall of the partition. When the faucet mentioned is opened, the pressure below the piston 14 will be reduced, the opening 17 being too small to allow the ready escape of water past the partition, and the excess pressure on the upper side of piston 14 will therefore cause the valve to open.

The switch operated by the piston 14, through the piston rod 18, is shown as mounted upon a base plate 19 supported by a yoke having a portion 20 perforated to seat over the stem 21 of the valve closure and having upwardly extending arms 22, 23 secured to the plate, as by means of bolts 24, 25. The circuit controlling elements of the switch are shown as mounted upon a block of insulation 26, mounted upon the plate 19, and comprise members 27, 28 upon which the switch blades 29, 30 are pivoted, and contacts 31, 32 between which the blades 29, 30 of the switch are adapted to pass for completion of a circuit.

The pivotal members 27, 28 and the contacts 31, 32 are shown as having base members and upwardly projecting portions integral with the base member, and the base member is shown as secured to the insulating plate by means of screws, two of which are shown in dotted lines in Fig. 1, at 33, 34.

For connection of the conductors 35, 36, 37, 38 to the switch a bar 39 is shown for each of the members 27, 28, 31 and 32, which bars pass between the upright portions of the switch elements referred to, and above the base members 40 thereof, and have tapped openings to be engaged by the screws 33, 34, thus securing the bars 39 in conductive relation with the switch elements, and acting as securing members for the switch elements. A binding screw 41 is shown engaging a tapped opening in the projecting end of each of the bars 39, by means of which the conductors are clamped to the bars 39. The conductors 35—38 are shown as passing through openings in the base plate, which openings are provided with insulating bushings 42.

To operate the switch blades, there is shown a bar 43 of insulating material secured between the blades 29, 30, as by means of screws 44, 45. The point at which the bar 43 is attached is adjacent to the pivot screws 46, 47, which mount the switch blades upon the switch elements 27, 28.

To apply power to the bar 43, a yoke 48 is shown formed of a base member 49, with spaced standards 50, 51, at each end thereof, opposite pairs of said standards being connected at their top, as shown at 52. The yoke is freely slidable through an opening 53 in the base plate 19 and in the insulating block 26, and is rigidly secured to the rod 18 as by means of locknuts 54, 55.

Mounted upon a nut 56, secured to the rod 18, there is shown a plate 57 having a recess at each corner for co-action with the uprights 50, 51, the plate being recessed to serve as a seat for a spring 58, which spring has a second seat in a second plate 59, having an outer form to correspond with plate 57. The end of the rod 18 is shown as projecting above plate 57 for a purpose to be described. To hold the switch normally open, a spring 60 is shown surrounding the rod 18 and acting in compression against a nut 61 upon the rod and against a washer 62 seated upon the stuffing box closure 63 of the valve.

When the valve is opened the rod 18 will exert a positive pull upon the yoke 48 through the lock nuts 54, 55, which will act positively upon the bar 43 to close the switch. The lateral movement of the bar 43, due to its rotation about the pivot screws 46, 47 is made possible by the relation of the diameter of the bar 43 to the space between the uprights 50, 51. The switch elements 32, 33 are so spaced apart as to exert a considerable frictional grip upon the blades 29, 30 of the switch. Therefore when the faucet controlling the outflow from the pipe 12 is closed, and the spring 60 is allowed to return the piston 14 to the closed position, the blades of the switch will be retained by the contact elements until the pressure of spring 58 becomes sufficient to overcome the grip, when the switch will be opened with a snap action.

In the event that the spring 58 is not able to overcome the grip of the contact elements upon the switch blades, as in the event that arcing should slightly weld the parts together, the projecting end of the rod 18 will come in contact with plate 59 and give the switch a positive push to break the adherence. When thus broken the pressure of spring 58 will cause snap action of the switch.

A cover 64 is shown as secured to the base 19 by means of screws 65, engaging ears 66 upon the base plate, and by means of screws 67 engaging ears 68 upon the base plate and depending ears 69 upon the cover. The cover may be open for inspection by removal of the screw 65 only, the cover pivoting about the screws 67, and a handle 70 is provided for ready manipulation of the cover.

Minor changes may be made in the physical embodiment of the invention without departing from its spirit.

I claim:—

1. A pressure operated switch comprising, in combination, a valve, a piston in said valve actuated to open the valve by means of reduction of pressure upon one side thereof, said valve having a restricted opening for equalization of pressure when flow through the valve is stopped, a rod connected with said piston, a yoke carried by said rod, a spring acting upon said rod to close said valve, a switch positively actuated by said yoke when said piston moves to open the valve, a spring between said yoke and switch resiliently pressing said switch toward open position when said valve is closed by action of said first named spring, and means for positively pressing said switch toward open position upon full compression of said second named spring.

2. A pressure operated switch comprising, in combination, a valve, a piston in said valve actuated to open the valve by means of reduction of pressure upon one side thereof, a yoke carried by said rod, a spring acting upon said rod to close said valve, a switch comprising a pivoted blade, and spring contacts adapted to grip said blade when the switch is closed, said yoke acting positively to close said switch when said piston moves to open the valve, a spring between said yoke and switch, the grip of said spring contacts being sufficient to hold said switch closed against the pressure of said last named spring, and means for positively pressing said switch to an open position upon full compression of said last named spring.

MANUEL D. DOMINGUEZ.